US012366091B2

(12) United States Patent
Avila

(10) Patent No.: US 12,366,091 B2
(45) Date of Patent: Jul. 22, 2025

(54) COMPACT GEAR LOCK

(71) Applicant: VISION ENGINEERING, Mansfield, TX (US)

(72) Inventor: Henry Avila, Mansfield, TX (US)

(73) Assignee: VISION ENGINEERING, Mansfield, TX (US)

( * ) Notice: Subject to any disclaimer, the term of this patent is extended or adjusted under 35 U.S.C. 154(b) by 112 days.

(21) Appl. No.: 18/384,294

(22) Filed: Oct. 26, 2023

(65) Prior Publication Data

US 2024/0141698 A1 May 2, 2024

Related U.S. Application Data

(60) Provisional application No. 63/419,877, filed on Oct. 27, 2022.

(51) Int. Cl.
*E05B 65/00* (2006.01)
*A47F 3/04* (2006.01)

(52) U.S. Cl.
CPC ............ *E05B 65/0042* (2013.01); *A47F 3/04* (2013.01)

(58) Field of Classification Search
CPC ................... A47F 3/04; E05B 65/0042; E05B 2015/0235; E05B 63/12; E05B 47/023; E05B 47/00; E05B 47/0001; E05B 2047/0016; E05B 2047/002; E05B 85/02; E05B 9/00; E05B 9/08; E05B 17/0012; E05B 17/007; E05B 2047/0021; E05B 2047/0022; E05B 81/34; E05B 81/36; E05B 81/38; Y10T 292/564; Y10T 292/1079; Y10T 292/0911; Y10T 292/696; Y10T 292/702; Y10T 292/096; E05C 3/006; E05C 3/008; E05C 3/26
See application file for complete search history.

(56) References Cited

U.S. PATENT DOCUMENTS 369,146 A * 8/1887 Woll ........................ E05B 83/24 292/199
753,642 A * 3/1904 Sliga ................... E05B 65/0864 292/99
821,248 A * 5/1906 Lipe et al. ................ F16H 3/04 74/332

(Continued)

FOREIGN PATENT DOCUMENTS

CA 2798465 A1 * 6/2013 ............. B64C 25/26
CN 100570530 C * 12/2009 ............... E05C 1/10

(Continued)

OTHER PUBLICATIONS

KR100838657 Espacenet machine translation claims and description (Year: 2025).*

*Primary Examiner* — Kristina R Fulton
*Assistant Examiner* — Steven A Tullia
(74) *Attorney, Agent, or Firm* — David R. Heckadon; Gordon Rees Scully Mansukhani LLP

(57) ABSTRACT

A gear lock system, including: a movable actuator; a gear rack connected to the actuator, wherein movement of the actuator causes the gear rack to move; a hook in meshed contact with the gear rack; and a clip dimensioned to wrap around the hook and the gear rack, wherein the gear rack and hook are flat, wherein force on the hook from opening a cabinet door is not transmitted to the gear rack or to the actuator.

16 Claims, 8 Drawing Sheets

(56) References Cited

U.S. PATENT DOCUMENTS

| | | | | | |
|---|---|---|---|---|---|
| 1,213,651 | A * | 1/1917 | Johns | E05C 19/022 | 292/99 |
| 1,272,327 | A * | 7/1918 | Bisaillon | E05B 47/0002 | 292/124 |
| 4,931,789 | A * | 6/1990 | Pinnow | G07C 9/00182 | 340/5.64 |
| 4,958,508 | A * | 9/1990 | Lin | E05C 3/34 | 70/355 |
| 5,346,266 | A * | 9/1994 | Bisbing | E05C 5/00 | 292/64 |
| 5,595,409 | A * | 1/1997 | Fier | E05B 65/0817 | 292/341.13 |
| 5,896,769 | A * | 4/1999 | Elpern | E05B 47/0012 | 70/279.1 |
| 6,359,547 | B1 * | 3/2002 | Denison | B60R 25/102 | 340/663 |
| 7,228,719 | B2 * | 6/2007 | Alchin | E05B 65/0858 | 70/121 |
| 8,317,349 | B2 * | 11/2012 | Hernandez | A47F 3/04 | 362/249.02 |
| 8,783,737 | B2 * | 7/2014 | Marschner | E05B 47/023 | 292/195 |
| 12,012,777 | B2 * | 6/2024 | Wood | G07C 9/00896 | |
| 12,210,025 | B2 * | 1/2025 | Yamashita | G01N 35/00 | |
| 12,241,282 | B2 * | 3/2025 | Jensen | E05B 63/0013 | |
| 12,270,228 | B2 * | 4/2025 | Jensen | E05B 15/004 | |
| 2005/0284200 | A1 * | 12/2005 | Moon | E05B 47/0673 | 70/278.2 |
| 2008/0303294 | A1 * | 12/2008 | Milks | B60J 7/1642 | 292/256.5 |
| 2022/0205291 | A1 * | 6/2022 | Cheung | E05B 53/00 | |

FOREIGN PATENT DOCUMENTS

| | | | | | |
|---|---|---|---|---|---|
| CN | 107386792 | A | * | 11/2017 | E05B 3/00 |
| CN | 207296632 | U | * | 5/2018 | E05B 3/00 |
| DE | 3811726 | A1 | * | 11/1988 | |
| DE | 10015010 | C2 | * | 8/2002 | B04B 7/06 |
| DE | 102006035358 | A1 | * | 4/2008 | E05B 47/0012 |
| DE | 102011050495 | A1 | * | 11/2012 | E05B 47/0012 |
| DE | 102012106722 | A1 | * | 1/2014 | E05B 47/026 |
| EP | 0927810 | A1 | * | 7/1999 | E06B 9/80 |
| EP | 2525025 | A2 | * | 11/2012 | E05B 47/0012 |
| EP | 3741939 | A1 | * | 11/2020 | E05B 5/006 |
| FR | 2682421 | A1 | * | 4/1993 | E05C 19/001 |
| GB | 2324331 | A | * | 10/1998 | E05B 63/0004 |
| GB | 2340872 | A | * | 3/2000 | E05C 9/021 |
| JP | 2007275299 | A | * | 10/2007 | A63F 7/02 |
| JP | 4304685 | B2 | * | 7/2009 | A63F 7/02 |
| JP | 4918568 | B2 | * | 4/2012 | A63F 7/02 |
| KR | 100247727 | B1 | * | 4/2000 | E05B 65/0042 |
| KR | 100838657 | B1 | * | 6/2008 | E05B 47/0001 |
| KR | 20090115784 | A | * | 11/2009 | E05B 49/00 |
| KR | 20100098760 | A | * | 9/2010 | E05C 19/10 |
| KR | 20110007369 | A | * | 1/2011 | E05C 3/12 |
| KR | 20150106311 | A | * | 9/2015 | E05B 15/0205 |
| WO | WO-0019044 | A1 | * | 4/2000 | E05B 15/025 |
| WO | WO-2019026301 | A1 | * | 2/2019 | E05B 47/00 |

* cited by examiner

COMPACT GEAR LOCK

RELATED APPLICATION

The present application claims priority to U.S. Provisional Patent Application, Ser. No. 63/419,877, of same titled, filed Oct. 27, 2022, the entire disclosure of which is incorporated herein by reference in its entirety for all purposes.

TECHNICAL FIELD

The present invention relates to door locking systems in general and to locking systems for convenience and shopping stores' chillers and refrigerated cabinets in particular.

BACKGROUND OF THE INVENTION

Shoplifting is a huge and growing problem for both small convenience stores and for larger grocery stores. These stores are particularly vulnerable since shoplifters easily open refrigerated cabinets and steal the items therein (after seeing the items displayed behind the glass doors of the cabinets).

Therefore, more and more stores are turning to locking their cabinets and display items. Unfortunately, large, bulky locking systems generate poor customer appeal since law abiding patrons often feel like they are shopping in a maximum security establishment.

What would instead be desired is a locking system for these glass cabinet doors that is small enough that most customers won't see it, or at least won't be visually turned off when noticing it. Importantly as well, such a small, compact locking system would need to be very strong so that the locking mechanism could not simply be overpowered or broken by brute force. Finally, such a desired locking system would ideally be remotely controllable such that the sales people in the store could easy remotely lock the cabinets should they feel threatened by one or more customers in the store. Oftentimes, several people invade and shoplift a single store at the same time, and the salesperson(s) quickly become overwhelmed. These attacks have grown more and more brazen in recent years. It would therefore be ideal if the salesperson(s) could simply remotely lock their cabinet doors prior to a shoplifting attack.

As will be shown herein, the present locking system addresses these problems and provides a compact, very small profile lock that has excellent strength properties and can be remotely controlled by the salespeople (or after hours maintenance people) at the store.

SUMMARY OF THE INVENTION

In one preferred aspect, the present system provides a compact gear lock system comprising: a faceplate with a slot passing therethrough; an actuator connected to the faceplate; a gear rack connected to the actuator, wherein movement of the actuator causes the gear rack to move; a hook in meshed contact with the gear rack, wherein a front portion of the hook projects through the slot in the faceplate; and a clip dimensioned to wrap around the hook and the gear rack, wherein a front portion of the clip projects through the slot in the faceplate.

In preferred aspects, both the hook and the gear rack are flat and are received within parallel top and bottom sides of the clip that hold the gear rack and hook in meshed engagement with one another. The clip is spring fit into the slot in the faceplate, making assembly both fast and simple. A narrowed neck portion on the top and bottom of the clip expands into upper and lower grooves in the slot in the faceplate, and a fastening pin passes through the clip and the hook thereby also helping to hold the hook in meshed contact with the gear rack.

One advantage of this approach is that the gear connection between the gear rack and the hook is not stripped during assembly. In addition, no part of the present system needs to be bent or force-fit together during assembly. Rather, as will be shown, system assembly is clean, neat and does not stress or damage any of the system components.

In addition, a mounting bracket is mounted to a cabinet door or shelf, and the mounting bracket is held in position by a screw or latch pin that passes through the mounting bracket, and the hook is dimensioned to wrap around the screw or latch pin when the cabinet door is locked.

One advantage of the present system is that any force on the hook from opening a cabinet door is not transmitted to the gear rack or to the actuator. As such, the present actuator is a very small device positioned in a comparatively small housing. In spite of its small compact size, the present Applicant has been able to build the system to resist up to 300 pounds of force. It is to be understood, however, that the present system is not limited to any particular size or strength and that stronger versions of the device can be built, all keeping within the scope of the present invention.

In optional aspects, a control system operates the actuator. Such control system may be remotely controlled and may include an LED driver wired to the actuator and an RF controller connected to the LED driver. A programmable logic controller or key fobs may also be used.

In another preferred aspect, the present system provides a gear lock system, comprising: a housing; a movable actuator disposed within the housing; a gear rack connected to the actuator, wherein movement of the actuator causes the gear rack to move; and a hook in meshed contact with the gear rack, wherein movement of the gear rack causes the hook to rotate. Preferably also included is a faceplate with a slot passing therethrough, wherein a front portion of the hook projects through the slot in the faceplate.

The hook and the gear rack are both flat with a clip having a pair of parallel sides that are positioned parallel to the hook and the gear rack, such that the parallel sides of the clip hold the hook and the gear rack in meshed engagement with one another.

Preferably also included are a mounting bracket mounted to a cabinet door or shelf, wherein the mounting bracket is held in position by a latch pin that passes through the mounting bracket, and wherein the hook is dimensioned to wrap around the latch pin when the cabinet door is locked. Advantageously, force on the hook from opening a cabinet door is not transmitted to the gear rack or to the actuator.

DETAILED DESCRIPTION OF THE DRAWINGS

Figure 7:
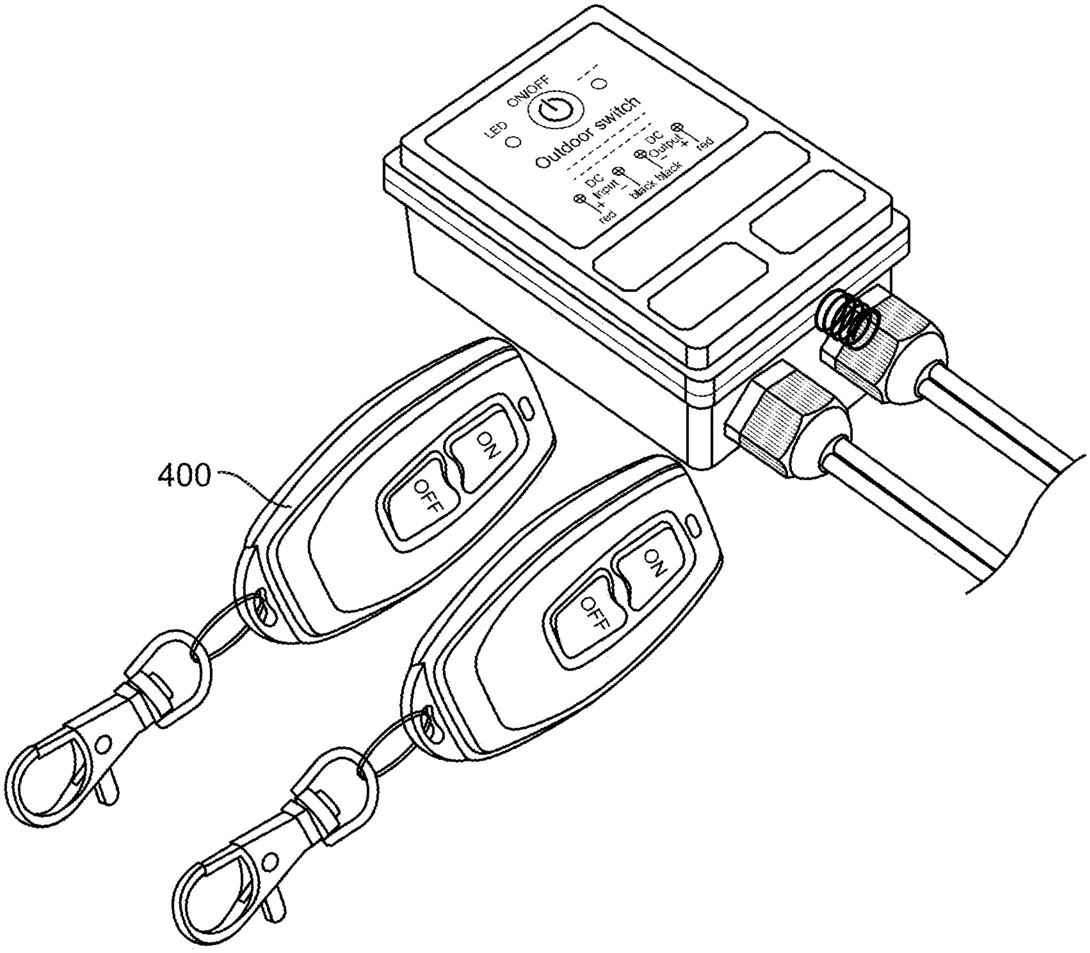
FIG. 7 is an illustration of a wireless Key Remote system for use with the present locking mechanism.
Figure 8:
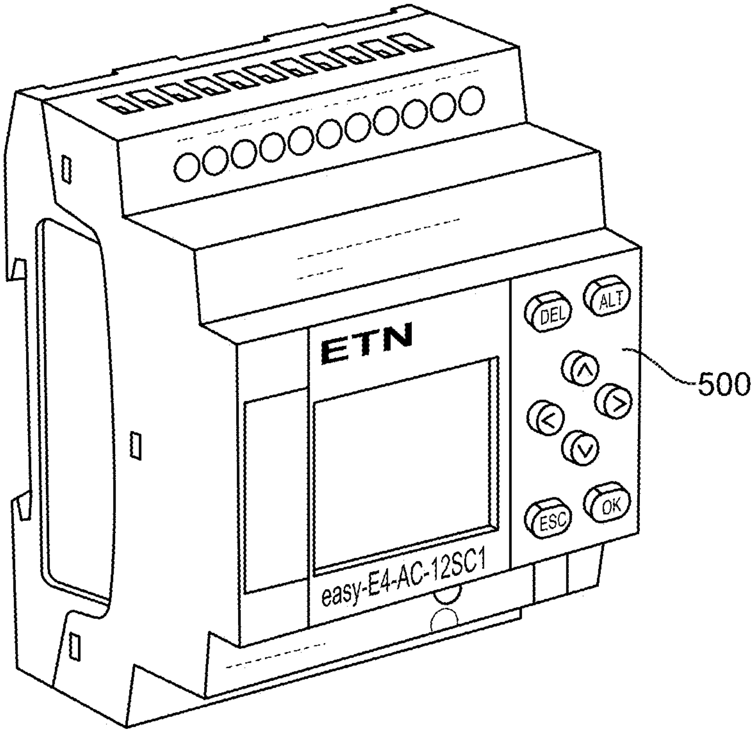
FIG. 8 is an illustration of a Programmable Logic Controller for use with the present locking mechanism.
Figure 9:
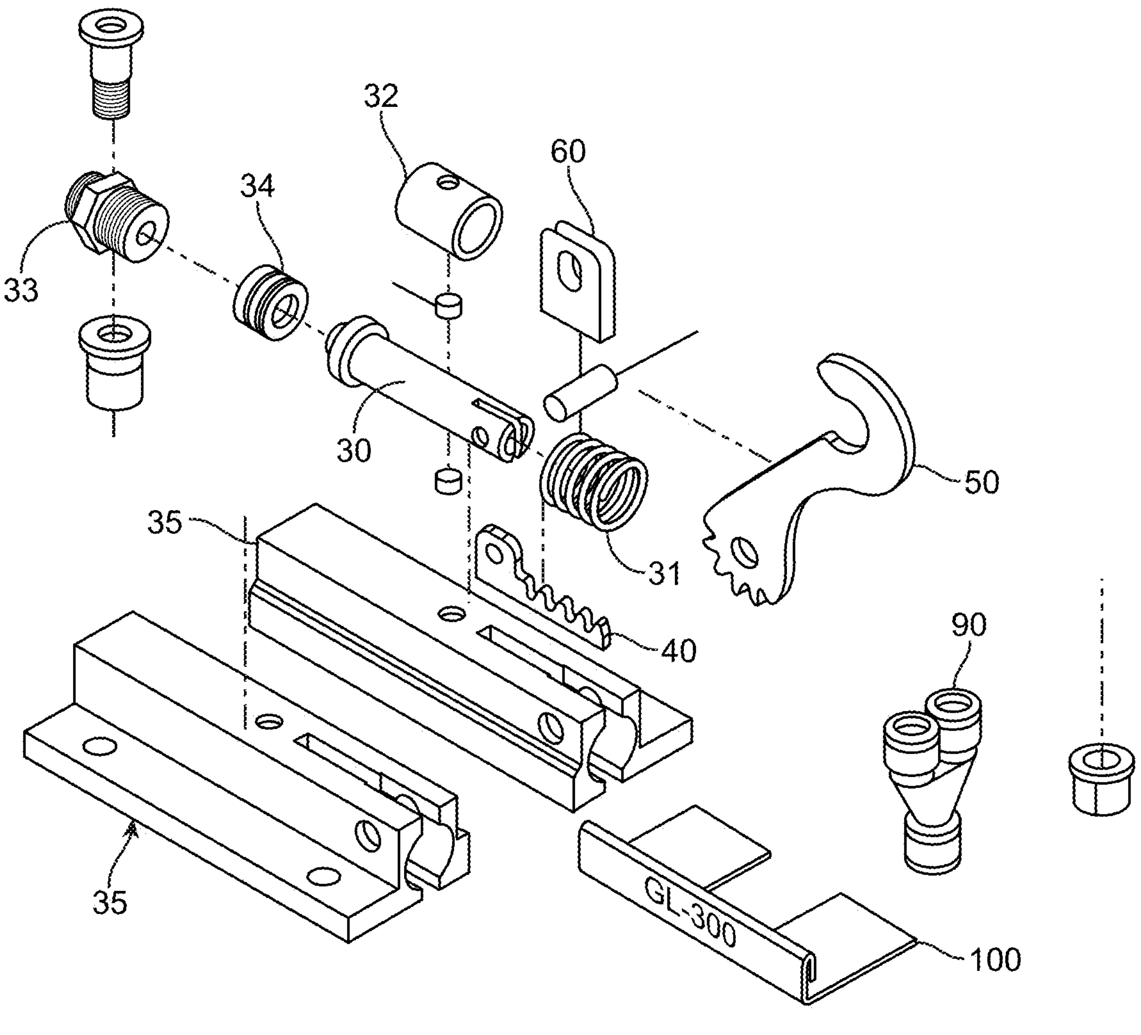
FIG. 9 is an exploded, unassembled view of a second embodiment of the present gear lock system.

FIGS. 1 to 4 illustrate a first embodiment of the present system. FIG. 9 illustrates a second embodiment of the present invention. FIGS. 5 to 8 illustrate various components and systems that may be used with either embodiment of the present gear lock system.

Figure 1:
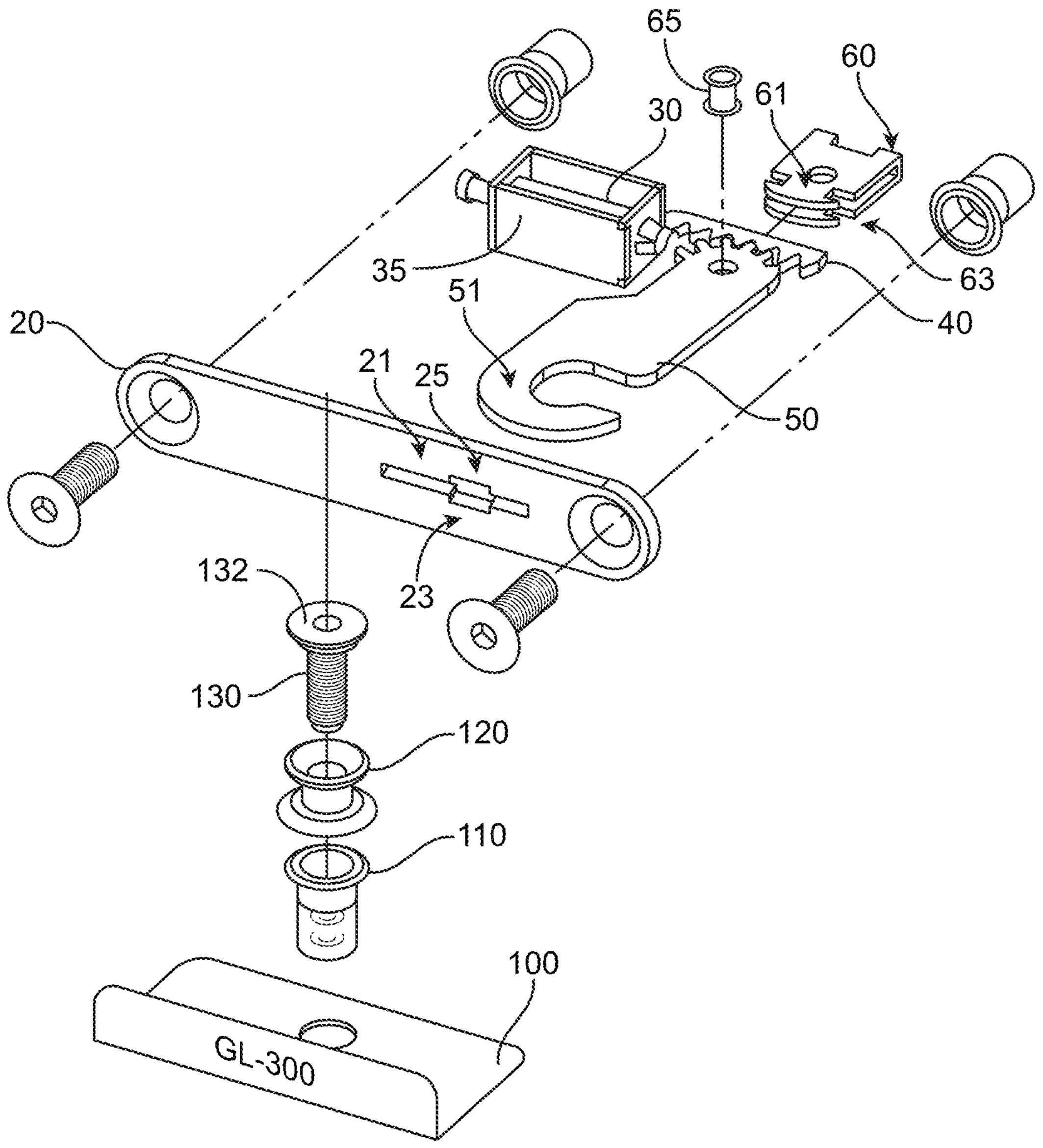
FIG. 1 is an exploded view of a first embodiment of the present compact locking system.

First, FIG. 1 is an exploded view of the present compact locking gear system 10 comprising:

- a faceplate 20 with a slot 21 passing therethrough;
- an actuator 30 connected to faceplate 20;
- a gear rack 40 connected to actuator 30, wherein movement of the actuator causes the gear 40 to move;
- a hook 50 in meshed contact with gear rack 40, wherein a front portion 51 of hook 50 projects through slot 21 in faceplate 20; and
- a clip 60 dimensioned to wrap around hook 50 and a portion of gear rack 40, and wherein a front portion 61 of clip 60 also projects through slot 21 in faceplate 20.

As can be seen, hook 50 and gear rack 40 are both flat, and clip 60 has a pair of parallel sides (i.e.: the top and bottom as illustrated) that are positioned parallel to hook 50 and gear rack 40 (i.e.: a top side of clip 60 is positioned above the hook and gear rack and a bottom side of clip 60 is positioned below the hook and gear rack), such that the parallel sides of the clip hold the hook 50 and gear rack 40 in meshed engagement with one another. Back-and-forth movement of actuator 30 results in rotation of hook 50.

Figure 2:
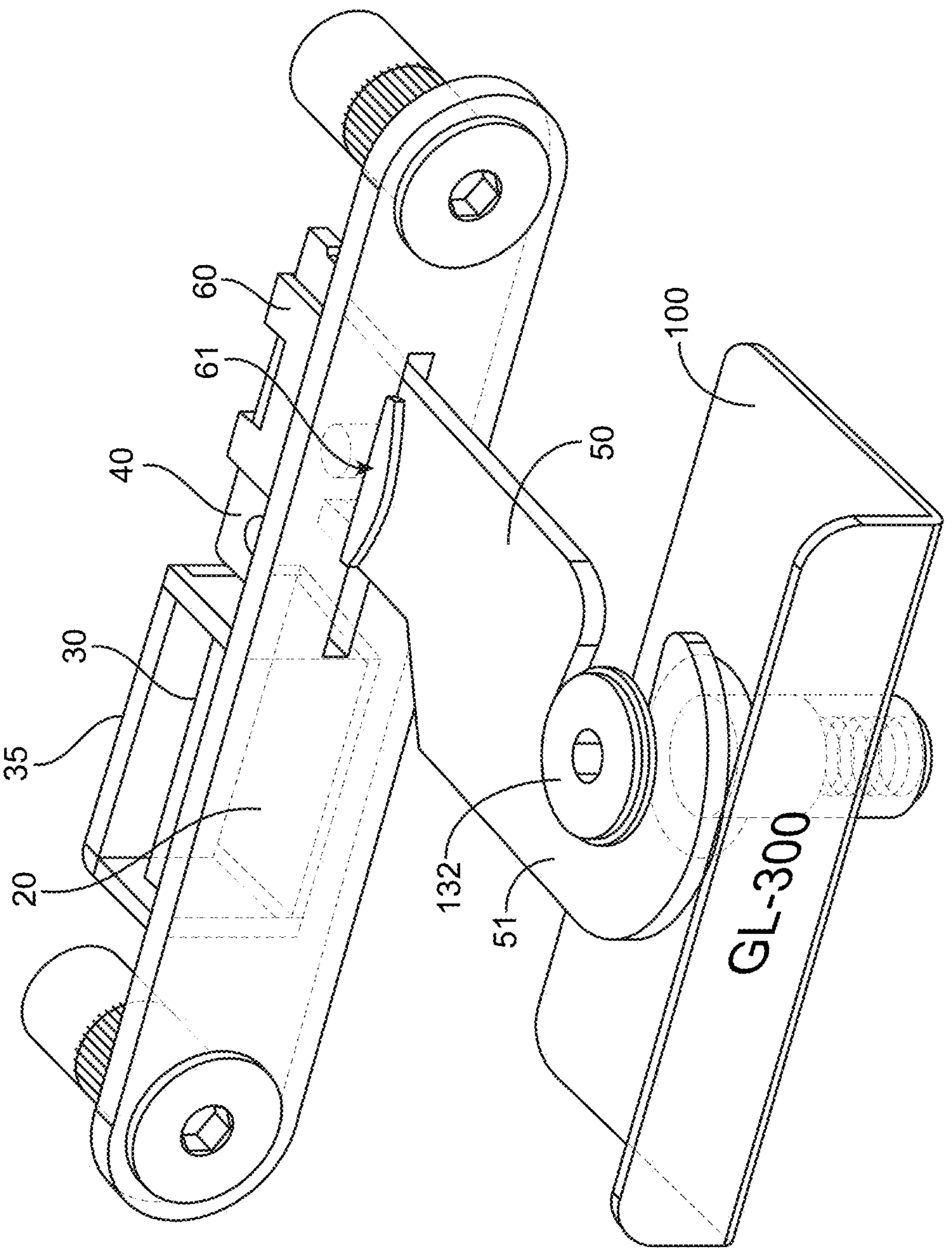
FIG. 2 is a perspective view of the system of FIG. 1 in a locked position.
Figure 3:
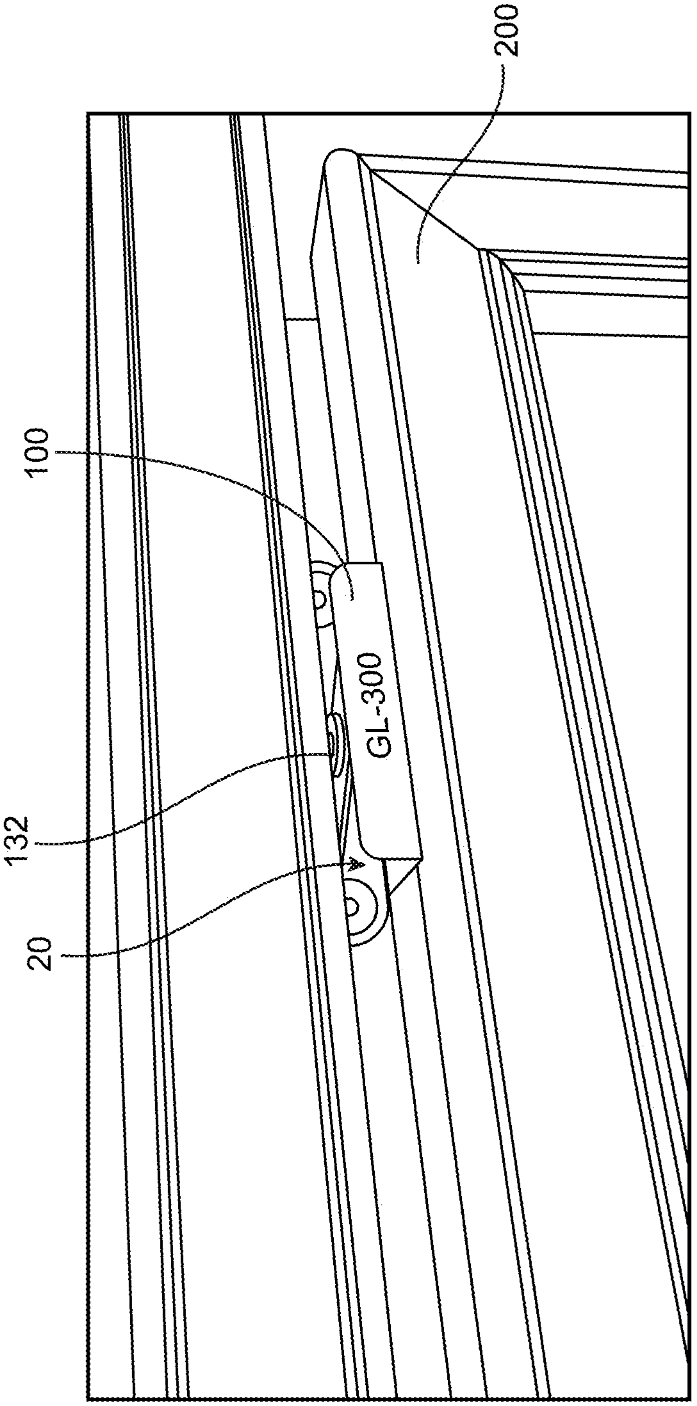
FIG. 3 is a perspective view of the present system installed on a refrigerator/chiller cabinet door.

As best seen in FIG. 2, clip 60 is inserted into grove 21 such that the front portion 61 of the clip projects through slot 21. Preferably, clip 60 is biased to slightly spring open, pushing against the top and bottom edges of groove 61. As a result, clip 60 can be spring fit into slot 21 in faceplate 20. As can also be seen in FIGS. 1 and 2, the top and bottom parallel sides of clip 60 may include a narrowed neck portion 63 that is received into one of an upper and lower groove 23 and 25 in slot 21 in faceplate 20. Clip 60 preferably is biased to expand during system assembly such that the narrowed neck portions 63 (on each of the top and bottom portions of clip 60) move into the upper and lower grooves 23 and 25 in slot 21 in faceplate 20. This has the effect of securing clip 60 within groove 20 while also allowing clip 60 to hold hook 50 and gear rack 40 in intermeshed contact with one another. As can also be seen in FIG. 1, a fastening pin 65 passes through clip 60 and hook 50, thereby holding hook 50 in meshed contact with gear rack 40. As can be seen in FIG. 3, the present system is compact, small, and visually unobtrusive when installed.

Figure 4:
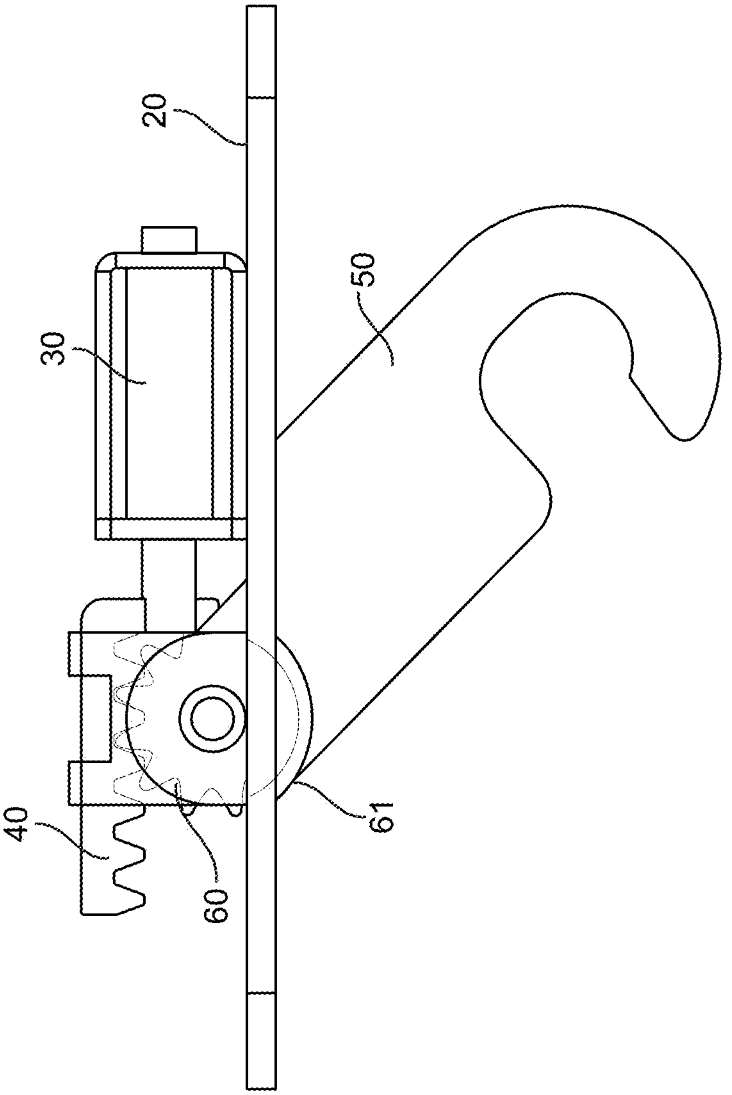
FIG. 4 is a top plan view of the first embodiment of the present system in an unlocked position.
Figure 5:
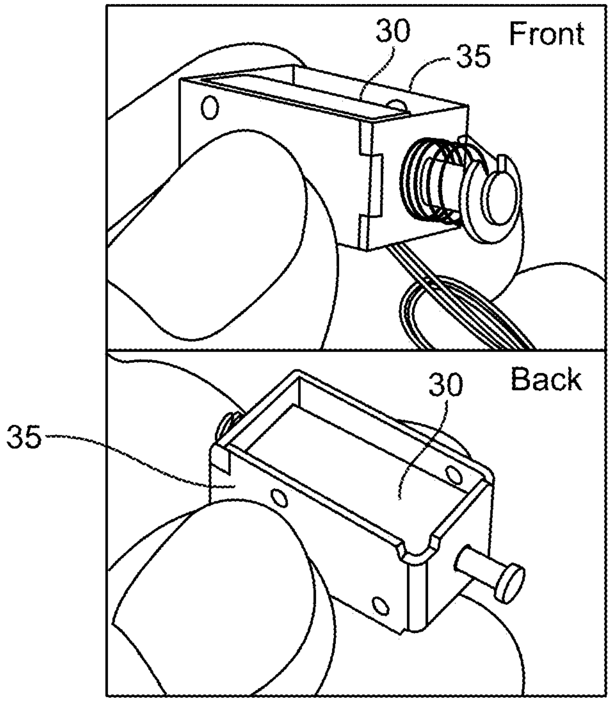
FIG. 5 is an illustration of the present actuator in a housing showing its small size.

FIG. 4 illustrates how the movement of actuator 30 causes gear rack 40 to move, which in turn causes rotation of hook 50. Actuator 30 (which is preferably enclosed in a housing mounted directly against faceplate 20) moves gear rack 40 back and forth (with gear rack 40 itself preferably remaining parallel to and equidistant from faceplate 20 during its movement). The actuator 30 is housed in the box 35 in FIG. 1 and is also illustrated being held by a person in FIG. 5. The housing 35 holding movable actuator 30 can simply be welded or screw-attached onto the back of faceplate 20.

FIG. 1 also illustrates a bracket 100, bushings 110 and 120, and screw 130. In operation, screw 130 is fastened into bracket 100 such that an upper end 132 of screw 130 is exposed. As seen in FIG. 3, bracket 100 may be attached to the top of a cabinet door 200 with upper end 132 of screw 130 being held by hook 50 (as seen in FIG. 2). Accordingly, a "latch pin" (optionally comprising any or all of bushings 110 and 120, and screw 130) holds mounting bracket 200 onto the top of a cabinet door or shelf. Hook 50 is dimensioned to wrap around the latch pin (screw 130) when the cabinet door 200 is locked.

As can be appreciated, when cabinet door 200 is forcibly urged open, any force on the door would only tend to pull screw 130 away from gear rack 40 (i.e.: thereby tending to pull the meshed connection between gear lock 40 and hook 50 apart). As a result, the force on hook 50 from opening cabinet door 200 is not transmitted to the gear rack 40 or to the actuator 30.

Figure 6:
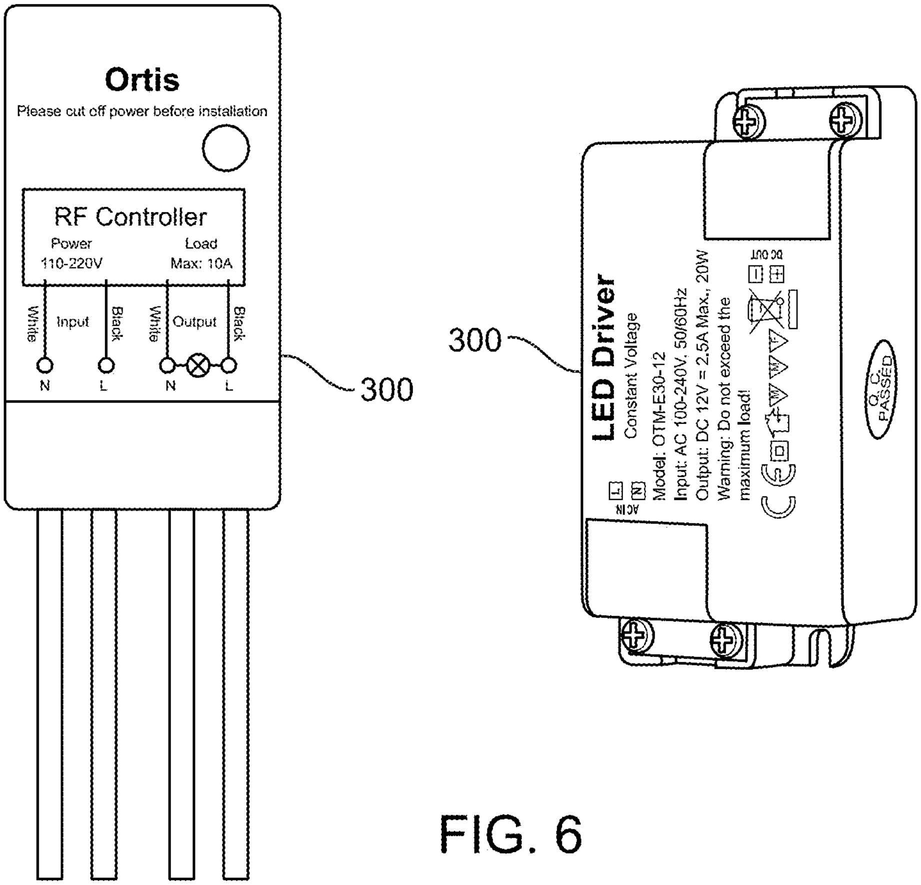
FIG. 6 is an illustration of an RF Controller and LED Driver for use as a wireless switch for operation with the present locking mechanism.

In optional preferred aspects, actuator 30 can be controlled remotely. For example, actuator 30 can be wired to an LED Driver which in turn can be wired to an RF Controller 300 (as illustrated in FIG. 6). In other embodiments, a wireless key fob 400 can be used to control system operation (as illustrated in FIG. 7). In other embodiments, a Programmable Logic Controller 500 can be used, for example to also set preferred times when the system is either locked or unlocked (as illustrated in FIG. 8).

In optional preferred aspects seen in FIG. 9, actuator 30 may be placed in housing 35 (both left-handed and right-handed versions of housing 35 are illustrated). In this embodiment, actuator 30 is spring biased by spring 31 and slides within housing 35. A nylon sleeve bearing 32 facilitates the back and forth movement of actuator 30. This embodiment of the present invention may optionally be controlled pneumatically with pneumatic tube fitting 33 causing actuator 30 to move. A faucet seal 34 is provided between tube fitting 33 and actuator 30. In operation, hook 50 locks onto the cabinet door screw 132 similar to as was described above.

What is claimed is:

1. A gear lock system, comprising:

a faceplate with a slot passing therethrough;

an actuator connected to the faceplate;

a flat gear rack connected to the actuator, wherein movement of the actuator causes the flat gear rack to move;

a flat hook in meshed contact with the flat gear rack, wherein a front portion of the flat hook projects through the slot in the faceplate; and a flat clip dimensioned to wrap around the flat hook and the flat gear rack, wherein a front portion of the flat clip projects through the slot in the faceplate, and wherein the flat clip has parallel sides that are positioned against and cover the meshed contact between the flat hook and the flat gear rack thereby holding the flat hook and flat gear rack in meshed engagement with one another.

2. The system of claim 1, wherein the flat clip is spring fit into the slot in the faceplate.

3. The system of claim 2, wherein each of the parallel sides of the flat clip include a narrowed neck portion that is received into one of an upper and lower groove in the slot in the faceplate.

4. The system of claim 3, wherein the flat clip expands during system assembly such that the narrowed neck portions move into the upper and lower grooves in the slot in the faceplate.

5. A gear lock system, comprising:

a faceplate with a slot passing therethrough;

an actuator connected to the faceplate;

a gear rack connected to the actuator, wherein movement of the actuator causes the gear rack to move;

a hook in meshed contact with the gear rack, wherein a front portion of the hook projects through the slot in the faceplate; and a clip dimensioned to wrap around the hook and the gear rack, wherein a front portion of the clip projects through the slot in the faceplate, and a fastening pin passing through the clip and the hook holding the hook in meshed contact with the gear rack.

6. The system of claim 1, wherein the flat gear rack remains parallel to and equidistant from the faceplate during its movement.

7. The system of claim 1, wherein force on the flat hook from opening a cabinet door is not transmitted to the flat gear rack or to the actuator.

8. The system of claim 1, further comprising:

a mounting bracket mounted to a cabinet door or shelf, wherein the mounting bracket is held in position by a latch pin that passes through the mounting bracket, and wherein the flat hook is dimensioned to wrap around the latch pin when the cabinet door is locked.

9. The system of claim 8, wherein the latch pin is received into the top of the cabinet door.

10. The system of claim 1, wherein the actuator is positioned in a housing mounted to the faceplate, further comprising a control system for moving the actuator in the housing.

11. The system of claim 10, wherein the control system comprises:

an LED driver wired to the actuator, and an RF controller connected to the LED driver.

12. The gear lock system of claim 1, further comprising:

a mounting bracket mounted to a cabinet door or shelf, wherein the mounting bracket is held in position by a latch pin that passes through the mounting bracket, and wherein the flat hook is dimensioned to wrap around the latch pin when the cabinet door is locked.

13. A gear lock system, comprising:

a housing;

a movable actuator disposed within the housing;

a flat gear rack connected to the actuator, wherein movement of the actuator causes the flat gear rack to move;

a flat hook in meshed contact with the flat gear rack, wherein movement of the flat gear rack causes the flat hook to rotate; and a flat clip dimensioned to wrap around the flat hook and the flat gear rack, wherein the flat clip has parallel sides that are positioned against and cover the meshed contact between the flat hook and the flat gear rack thereby holding the flat hook and flat gear rack in meshed engagement with one another.

14. The gear lock system of claim 13, further comprising:

a faceplate with a slot passing therethrough, wherein a front portion of the hook projects through the slot in the faceplate.

15. The gear lock system of claim 13, wherein the actuator is spring-loaded.

16. The gear lock system of claim 13, wherein force on the hook from opening a cabinet door is not transmitted to the flat gear rack or to the actuator.

* * * * *